Dec. 21, 1937.  B. JAUMANDREU  2,103,157
MANUFACTURE OF RUBBER-SOLED SLIPPERS, SANDALS, AND FOOTWEAR
Filed May 10, 1934
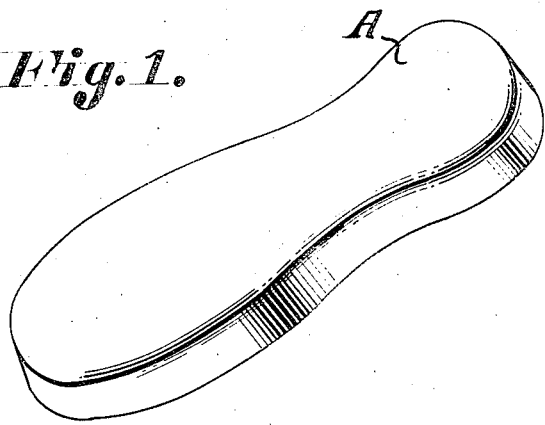
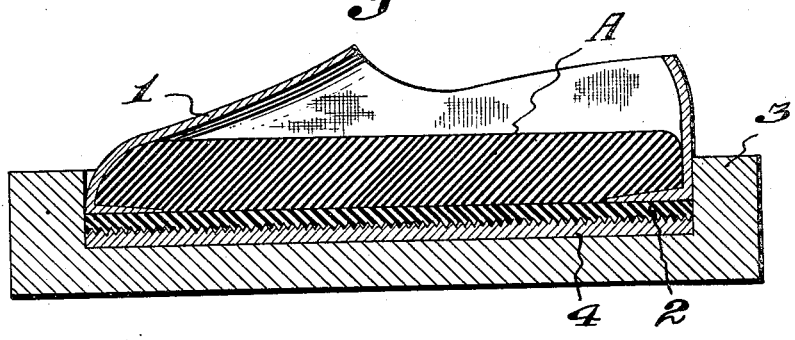
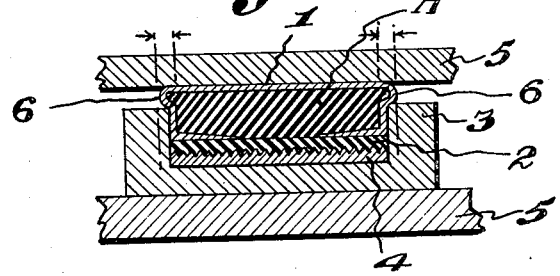
Inventor:
B. Jaumandreu
By: Glascock Downing & Seebold
Attys.

Patented Dec. 21, 1937

2,103,157

UNITED STATES PATENT OFFICE 2,103,157

MANUFACTURE OF RUBBER-SOLED SLIPPERS, SANDALS, AND FOOTWEAR

Bienvenido Jaumandreu, Buenos Aires, Argentina

Application May 10, 1934, Serial No. 724,963

1 Claim. (Cl. 18—59)

The present invention relates to footwear, and more particularly relates to improvements in the manufacture of rubber soled slippers, sandals or shoes which in view of the results obtained with test samples are called to meet with quick and ready acceptance by the trade, inasmuch as the improvements to which the present invention refers show an important step ahead, as compared to the methods used in the prior art.

It is a well known fact that many and very different methods are now being employed to join the upper material of which the slipper or shoe is made (canvas, or similar material) with the rubber sole—visible stitching being the method most widely used. In practice, such methods present many inconveniences, incompatible with foot comfort and economy for the user, in the first instance on account of the internal seam causing an excessively uncomfortable ridge, and in the second case because, due to the stitching being exposed it wears quickly thus making the slipper or shoe useless, with the consequent additional expense for the user.

In an effort to find remedy for these inconveniences, the method has been tried of vulcanizing the two materials of which the shoe is composed; i. e.: the upper material and the rubber sole, together, the vulcanization being effected in autoclaves and using metallic or wooden lasts or forms, which method frequently causes that a number of units be lost due to the upper material becoming stained or soiled, or on account of it becoming detached from the vulcanized rubber for lack of the necessary compression in this kind of operations.

The improvements which are the subject matter of the present invention obviate the above defects, which now offer a difficult problem to solve in the manufacture of footwear.

My improvements consist in the employment of a last or form of rubber or other plastic material, which will permit the vulcanization of the rubber sole directly on the upper material of the slipper or shoe applying direct pressure by means of an ordinary vulcanizing press.

In order that the present invention may be clearly understood and easily carried into practice, one of its preferred embodiments has been illustrated in the drawing by way of example, Figure I being a perspective view of a last or form of plastic material in accordance with the invention.

Fig. II is a longitudinal section of a slipper or shoe disposed in the mold showing the manner in which the rubber last or form is placed.

Fig. III is a transversal section illustrating the arrangement of the last or form and the parts to be vulcanized, after the same are compressed by the plates of a press.

In the drawing, similar figures and characters indicate the same or corresponding parts, and, as will be seen, A is a last or form made of rubber or other plastic material, which is placed inside the slipper or shoe 1, conveniently prepared, provided with an unvulcanized rubber sole 2, and this assembly is placed into the mold 3, which carries an imprinting plate 4 with the design which it is desired to imprint on the rubber sole 2. This mold is then placed in a plate press 5, following which the slipper or shoe 1 is given the necessary vulcanizing temperature and pressure, which will cause the curing of the rubber and at the same time its bonding with the canvas of the slipper or shoe (without soiling or impairing it due to the use of the elastic last or form) a bonding solution being used for this purpose.

The rubber last or form A, on being compressed by the plates 5 of the press, expands at the points 6 (which portion juts out from the mold 3) and this feature prevents the upper material of the slipper or shoe from being damaged and at the same time hermetically seals the mouth of the mold, thus preventing rubber from coming out and staining or soiling the upper material of the slipper or shoe.

It will be evident for those skilled in the art that on carrying into practice the present invention many modifications can be made in same as regards size, thickness and methods of compressing the form, without thereby departing from the fundamental principles of the invention, which I clearly specify in the following claim.

Having now described and ascertained the nature of my invention and the manner in which the same is to be performed I claim as being my exclusive property:

A method of manufacturing rubber soled footwear and like flexible articles utilizing elastic lasts, comprising providing a mold designed to snugly fit the lower part of the upper of the article, providing an elastic last of a size to extend beyond the open end of the mold, placing an unvulcanized rubber sole in the bottom of the mold, placing the upper with the last therein on the sole within the mold, and exerting pressure on the upper and last when in the mold to compress the upper and last and expand the portion of said last extending beyond the mold over the edges of the mold to thereby hermetically seal the open end of said mold.

BIENVENIDO JAUMANDREU.